United States Patent
Cheng et al.

(10) Patent No.: US 12,196,630 B2
(45) Date of Patent: Jan. 14, 2025

(54) SYSTEM AND METHOD FOR OPTICAL STRAIN MEASUREMENT

(71) Applicants: Nederlandse Organisatie voor toegepast-natuurwetenschappelijk onderzoek TNO, The Hague (NL); Amonics Limited, Hong Kong (CN)

(72) Inventors: Lun-Kai Cheng, Krimpen aan den Ijssel (NL); Wai Sing Man, Hong Kong (CN); Kwong Shing Tsang, Hong Kong (CN)

(73) Assignees: Nederlandse Organisatie voor toegepast-natuurwetenschappelijk onderzoek TNO, 's-Gravenhage (NL); Amonics Limited, Kowloon (HK)

( * ) Notice: Subject to any disclaimer, the term of this patent is extended or adjusted under 35 U.S.C. 154(b) by 110 days.

(21) Appl. No.: 17/789,138

(22) PCT Filed: Dec. 24, 2020

(86) PCT No.: PCT/NL2020/050819
§ 371 (c)(1),
(2) Date: Jun. 24, 2022

(87) PCT Pub. No.: WO2021/133172
PCT Pub. Date: Jul. 1, 2021

(65) Prior Publication Data
US 2023/0029510 A1    Feb. 2, 2023

(30) Foreign Application Priority Data
Dec. 27, 2019  (EP) ..................... 19219909

(51) Int. Cl.
*G01L 1/24* (2006.01)
*H01S 3/067* (2006.01)

(52) U.S. Cl.
CPC .......... *G01L 1/242* (2013.01); *H01S 3/06754* (2013.01)

(58) Field of Classification Search
CPC .... G01B 11/161; G01D 5/35361; G01L 1/242
See application file for complete search history.

(56) References Cited

U.S. PATENT DOCUMENTS 9,019,591 B2    4/2015  Awaji et al.
2002/0027706 A1 *  3/2002  Park ................... H01S 3/10015
                                                  359/341.41

(Continued)

OTHER PUBLICATIONS

L.K. Cheng et al., "Development of a Fringe Sensor based on 3×3 fiber Optic Coupler for Space Interferometry", 17th International Conference on Optical Fiber Sensors (2005).

(Continued)

*Primary Examiner* — Hina F Ayub
(74) *Attorney, Agent, or Firm* — Leydig, Voit & Mayer, Ltd.

(57) ABSTRACT

A position dependent strain measurement system detected strain as a function of position in an optical sensing fiber using an interferometer having an input coupled to the first end of the optical sensing fiber. An electronic phase measuring sub-system is coupled to an output of the interferometer. The electronic phase measuring sub-system defines a usable optical intensity range of input light of the interferometer, wherein the electronic phase measuring sub-system is capable of measuring the phase of the input light. An optically pumped optical fiber amplifier is coupled between the first end of the optical sensing fiber and the input of the interferometer in series with an electrically pumped semi-conductor optical amplifier. The electrically pumped semi-conductor optical amplifier having a non-linear intensity amplification range that overlaps with the usable optical intensity range. The optically pumped optical (Continued)

fiber amplifier is configured to amplify an intensity of backscattered light from the optical sensing fiber into the non-linear intensity amplification range.

10 Claims, 4 Drawing Sheets

(56) References Cited

U.S. PATENT DOCUMENTS

| | | | |
|---|---|---|---|
| 2004/0240044 A1* | 12/2004 | Park | H04B 10/2942 359/341.41 |
| 2010/0221012 A1 | 9/2010 | Awaji | |
| 2015/0124313 A1* | 5/2015 | Takahashi | H01S 3/1301 359/344 |
| 2016/0170081 A1 | 6/2016 | Jaaskelainen | |
| 2022/0057536 A1* | 2/2022 | Dailing, Jr. | G01H 9/004 |

OTHER PUBLICATIONS

P.V. Trinh et al., "All-Optical Relaying FSO Systems Using EDFA Combined With Optical Hard-Limiter Over Atmospheric Turbulence Channels", Journal of Lightwave Technology, vol. 33, No. 19, pp. 4132-4144 (Oct. 1, 2015).

M. Shiraiwa et al., "Ultra-stable optical amplifier technologies for dynamic optical switching networks." Next-Generation Optical Communication: Components, Sub-Systems, and Systems IV. Proc. of SPIE, vol. 9389, pp. 93890D-1 to 93890D-6 (2015).

Xiangge He et al., "Multi-event waveform-retrieved distributed optical fiber acoustic sensor using dual-pulse heterodyne phase-sensitive OTDR", Optics Letters, vol. 42, No. 3, pp. 442-445 (Feb. 1, 2017).

Zinan Wang et al., "Coherent Φ-OTDR based on I/Q demodulation and homodyne detection," Optics Express, vol. 24, No. 2, (6 pages) (Jan. 2016).

J.M.P. Almeida et al., "Third-order nonlinear spectra and optical limiting of lead oxifluoroborate glasses," Optics Express, vol. 19, No. 18, (6 pages) (Aug. 2011).

Hampus Lunden et al., "Nonlinear Materials for Optical Power Limiting: Characterization and Modelling," Linköping Studies in Science and Technology Thesis No. 1979 (73 pages) (2019).

Yuichi Tohmori et al., "High gain and low polarization dependent 1.55-μm semiconductor optical amplifier with a spot-size converter," NTT Photonics Laboratories, pp. 123-124 (2000).

Masaki Shiraiwa et al., "Performance evaluation of a burst-mode EDFA in an optical packet and circuit integrated network," Optics Express, vol. 21, No. 26, (10 pages) (2013).

European Patent Office, International Search Report in corresponding International Application No. PCT/NL2020/050819, dated Mar. 19, 2021 (3 pages).

Zhiyong Zhao et al., "Enabling Simultaneous DAS and DTS Through Space-Division Multiplexing Based on Multicore Fiber," Journal of Lightwave Technology, IEEE, USA, vol. 36, No. 24, pp. 5707-5713, XP011696752 (Dec. 15, 2018).

C-H Yeh et al., "Utilizations of EDFA and SOA in Series for Broadband Gain Amplification," Laser Physics Letters, vol. 4, No. 6, pp. 433-436, XP055704564 (Jun. 1, 2007).

* cited by examiner

SYSTEM AND METHOD FOR OPTICAL STRAIN MEASUREMENT

CROSS-REFERENCE TO RELATED APPLICATIONS

This patent application is a U.S. National Phase of PCT International Application No. PCT/NL2020/050819, filed Dec. 24, 2020, which claims priority to European Application No. 19219909.9, filed Dec. 27, 2019, which are both expressly incorporated by reference in their entireties, including any references contained therein.

FIELD OF THE INVENTION

The invention relates to a system and method for position dependent measurement of strain in an optical sensing fiber from backscattering of light from locations within the optical sensing fiber.

BACKGROUND

It is known to perform position dependent strain change measurements using Rayleigh scattered light from within an optical sensing fiber. Long sensing fibers (up to tens of kilometers) can be used for practical applications of strain change measurements, such as monitoring structural deformation of structures like bridges, building etc. or detecting intruders by means of a buried sensing fiber.

Rayleigh scattering is due to randomly distributed scatter centers in the optical sensing fiber. When a light pulse is transmitted into one end of the sensing fiber, distributed scattering of the pulse results in returned light at that end, with fluctuating phase and intensity as a function of time. The frequencies of occurrence of different backscatter intensities are characterized by an intensity distribution as a function of backscatter intensity. The return light at any given time is due to scatter centers at a selective distance from the end of the sensing fiber, so that the time needed by the pulse to travel that distance is half the given time.

In the sensing system, the local strain of the sensing fiber at that distance is determined using detection of changes in the optical phase difference between scattered light from different positions along the fiber. As long as the distance between the positions stays the same, this phase difference stays the same. But if the distance changes due to strain in the fiber between the locations, the phase difference change.

The optical phase difference between scattered light from pairs of different positions can be determined by feeding backscattered light from the optical sensing fiber along optical paths of different length and detecting interference between light from these different paths. A single intensity that results from such an interference depends on both the phase difference and the (fluctuating) scatter intensity. However, the optical phase difference can be computed by digitizing opto-electronic signals obtained from the backscattered light along the optical paths, including at least one interference signal between backscattered light along the different optical paths. This digitization defines a range of usable optical intensity combinations from which the phase can be determined.

Preferably, a high sampling frequency is used to enable high spatial resolution (e.g. about 100 MHz for about 1 m spatial resolution). However, the scattering Rayleigh intensity is low. It would be desirable to use commercially available optical communication fibers. But scattering is small in such fibers because it is minimized on purpose, since scattering is an undesirable effect for communication purposes. Instead specially designed optical fibers wherein the scattering along the fiber is not extremely low are often used.

To obtain intensities in a usable optical intensity range, it is known to amplify the backscattered light and to perform the phase measurement on the amplified backscattered light. A considerable amplification is needed for this. The amplification may be provided by adding a pumped fiber amplifier between the optical sensing fiber and the interferometer, for example with an erbium doped fiber amplifier (EDFA) or other optically pumped optical amplifier. In general, EDFA is the standard technology for amplification in optical fiber applications due to the high gain and high output.

However, in practice this still does not enable phase measurements for all positions along the optical sensing fiber. At some positions the intensities may be outside the range of usable optical intensity combinations. Thus as one example for very long optical sensing fibers the backscatter intensity from positions near the end of the optical sensing fiber may often drop below the range of usable optical intensity combinations. For measurements for a larger number of positions along the optical sensing fiber a control circuit can be used to raise the gain of the fiber amplifier in time intervals wherein the intensity at the input of the interferometer would otherwise drop below the usable optical intensity range and to reduce the gain of the fiber amplifier in time intervals wherein the intensity at the input of the interferometer would otherwise rise above the usable optical intensity range. But it has been found that this only improves the envelope of the Rayleigh scattering intensity along the fiber and still does not enable phase measurements for all positions along the optical sensing fiber.

SUMMARY

It is an object to provide for a position dependent strain measurement system wherein phase measurements for a larger number of positions along the optical sensing fiber are possible.

A position dependent strain measurement system according to claim 1 is provided. The system measures strain using Rayleigh backscattering from within an optical sensing fiber. Herein a series arrangement of an optically pumped optical fiber amplifier and an electrically pumped semi-conductor optical amplifier and/or a non-linear optical absorber upfront from the splitting of the optical paths of the interferometer is used to ensure that coherent combinations, of intensities obtainable at the at least one detector from an average intensity of the Rayleigh backscattering intensity, will be in a usable range of a detector of an electronic phase measuring sub-system.

Alternatively, this may be done with electrically pumped semi-conductor optical amplifiers and/or non-linear optical absorbers for the respective optical paths. When electrically pumped semi-conductor optical amplifiers and/or non-linear optical absorbers for the respective optical paths are used, the optically pumped optical fiber amplifier may also be replaced by optically pumped optical fiber amplifiers for the respective optical paths. The amplification factor of the optically pumped optical fiber amplifier amplifiers may be set to ensure that coherent combinations will be in the usable range of a detector of an electronic phase measuring sub-system for example.

The detector defines a usable range in terms of a predetermined minimum of quantization steps (e.g. at least fifty or a hundred quantization steps) under the obtainable coherent combination that is needed for a sufficiently reliable phase determination and its top quantizable intensity level. It should be noted that the usable range only serves to express a condition on intensities obtainable by a notional coherent combination of amplified average Rayleigh backscatter intensity, not on other combinations of actual intensities.

The electrically pumped semi-conductor optical amplifier or amplifiers and/or a non-linear optical absorber or absorbers are coupled between the optically pumped optical fiber amplifier or amplifiers and the electronic phase measuring sub-system. Because this provides a light intensity dependent derivative transmission factor or factors a higher intensity part of the intensity distribution of the Rayleigh backscattered light to be compressed relative to a lower intensity part of the intensity distribution of the Rayleigh backscattered light (as used herein the light intensity dependent derivative transmission factor is the derivative of the transmitted light intensity with respect to the input light intensity of the electrically pumped semi-conductor optical amplifier or non-linear optical absorber). Thus, a wider intensity fluctuation range of Rayleigh backscattered light intensity can be used to detect phase changes, and consequently the number of positions for which no reliable phase measurements are possible is reduced.

In an embodiment the amplification of the optically pumped optical fiber amplifier or amplifiers is arranged to bring the intensity of light obtainable from said average intensity of the Rayleigh backscattering intensity at the input of the electrically pumped semi-conductor optical amplifier or amplifiers and/or the non-linear optical absorber or absorbers to an intensity where the light intensity dependent derivative transmission factor is less than half the small signal transmission factor of the electrically pumped semi-conductor optical amplifier or amplifiers and/or the non-linear optical absorber or absorbers. The derivative transmission factor may even be less than a quarter of the small signal transmission factor or less than a quarter of the small signal transmission factor (as used herein the small signal transmission factor is the asymptotic value of derivative of the light intensity dependent derivative transmission factor when the intensity goes to zero). By amplifying the average to such levels, a significant widening can be realized of the range of lower intensities for which reliable phase measurements are possible.

The electrically pumped semi-conductor optical amplifier or amplifiers and/or the non-linear optical absorber or absorbers may be characterized by a saturated optical output intensity (i.e. an asymptotic value of the output intensity in the limit of infinite input intensity, or a maximum of the output intensity achieved for any allowable input intensity). The saturated optical output intensity may be configured to result in an intensity from individual ones of the optical path at the at least one detector that is equal to or less than a quarter of the intensity at the top of the usable range. Thus the intensity of a coherent sum of light with such intensity will not exceed the saturation value. This ensures that high backscatter intensities will not prevent accurate phase measurements.

In an embodiment the electronic phase measuring sub-system comprises an N-way coupler, with N at least three, configured to form N combinations of light from the first and second optical path with N different relative phase shifts, N detectors configured to measure intensities of respective ones of the N combinations, and a computing system configured to compute a phase difference between the light from the first and second optical paths from the measured intensities. Such a sub-system provides for removal of the effect of the intensities of light in the optical paths on the phase determination, provided that the maximum possible intensities of such combinations are in the usable range.

In long fibers a significant intensity reduction may occur with increasing distance from the input of the fiber and the scattering point. In an embodiment the average is an average of backscattering intensity from a distal part of the optical fiber. By setting the amplification to ensure that the average backscattering intensity in that distal part (e.g. in the last hundred meters of the optical fiber) the number of points where no reliable phase measurement is possible is reduced.

In an embodiment the measurement system comprises a gain control circuit configured to vary the amplification factor of factors of the optically pumped optical fiber amplifier or amplifiers with time from the light pulse, so that a time dependent average of the of the Rayleigh backscattering intensity at the electronic phase measuring sub-system is kept in the usable intensity range. The gain control circuit may provide for an amplification factor with a predetermined time dependence for example, or for feedback control based on detection of the average as a function of time.

In an embodiment, the system comprises means for amplifying both polarization components of the output light of the optically pumped optical amplifier with the semi-conductor optical amplifier or a combination of the semi-conductor optical amplifier and a further semi-conductor optical amplifier respectively before entering the interferometer this increases the signal to noise ratio.

In an embodiment these means comprise a polarization splitter with an input coupled to the output of the optically pumped optical fiber amplifier and a first polarization output coupled to the input of the semi-conductor optical amplifier, a polarization rotator with an input coupled to a second polarization output of the polarization splitter, a further electrically pumped semi-conductor optical amplifier with an input coupled to an output of the polarization rotator, and an optical combiner with inputs coupled to outputs of the electrically pumped semi-conductor optical amplifier and the further electrically pumped semi-conductor optical amplifier, and an output coupled to the interferometer. In another embodiment the system comprises a polarization splitter with an input coupled to the output of the optically pumped optical fiber amplifier, a polarization rotator with an input coupled to a first polarization output of the polarization splitter and an optical combiner with inputs coupled to a second polarization output of the polarization splitter and an output of the polarization rotator and an output coupled to the input of the semi-conductor optical amplifier.

In an embodiment, the optically pumped optical fiber amplifier or amplifiers is or are a transient suppressing optical fiber amplifier or amplifiers. This prevents problems due to a sudden rise of backscatter intensity from the input end of the optical fiber.

BRIEF DESCRIPTION OF THE DRAWING

These and other objects and advantageous aspects will become apparent from a description of exemplary embodiments with reference to the following figures.

DETAILED DESCRIPTION OF EXEMPLARY EMBODIMENTS

Figure 1:
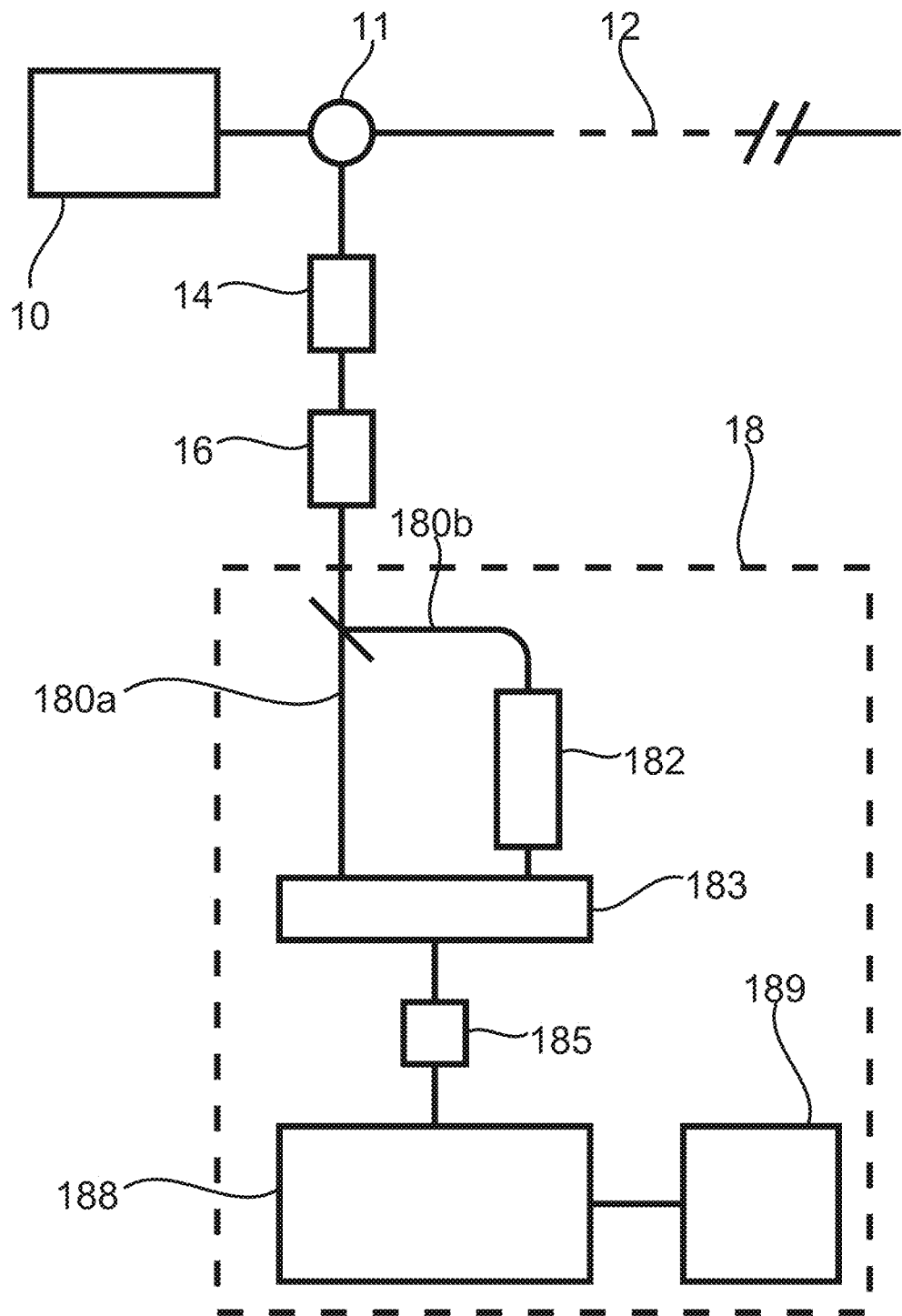
FIGS. 1, 1a shows a strain change measuring system
Figure 1A:
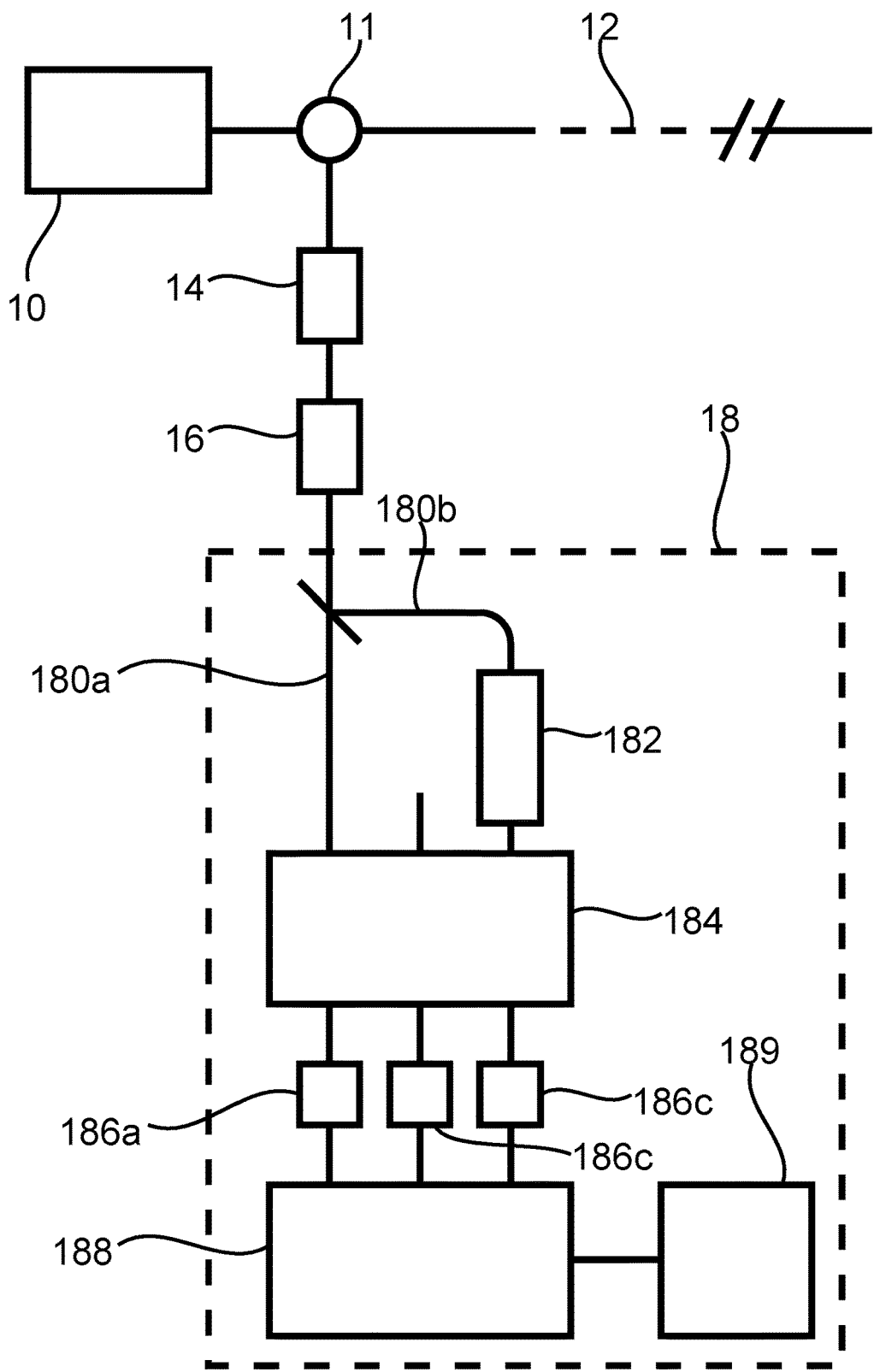

FIGS. 1 and 1a shows a strain change measuring system comprising a pulsed light source 10, an optical sensing fiber 12, an optical fiber amplifier unit 14, a semi-conductor optical amplifier 16 and an interferometric measuring sub-system 18. The output of pulsed light source 10 is coupled to a first end of optical sensing fiber 12. The first end of optical sensing fiber 12 is further coupled to an input of optical fiber amplifier unit 14 to amplify light returned from within optical sensing fiber 12 through first end of optical sensing fiber 12. As the pulsed light source 10 and the returned light travel in opposite directions along the same path, an optical coupling device in that optical path is used to direct part or all of the returned light to optical fiber amplifier unit 14. By way of illustration an optical circulator 11 is shown between pulsed light source 10 and optical sensing fiber 12 for this purpose, but alternatively another type of coupler such as a splitter may be used.

Optical fiber amplifier unit 14 may comprise one or more optical fiber amplifiers in series, for example a low-noise pre-amplifier and a further optical fiber amplifier. The output of optical fiber amplifier unit 14 is coupled to an input of semi-conductor optical amplifier 16. The output of semi-conductor optical amplifier 16 is coupled to interferometric measuring sub-system 18. Preferably, optical fiber amplifier unit 14 is an optically pumped amplifier such as an EDFA or YDFA, which comprises a pump light source configured to supply pump light into a doped region in an optical fiber part through which the backscattered light from optical sensing fiber 12 travels to semi-conductor optical amplifier 16.

In contrast, semi-conductor optical amplifier 16 is an electrically pumped amplifier, preferably realized on a planar substrate, wherein the pump signal is supplied from electronic circuitry. When semi-conductor optical amplifier 16 is realized on a planar substrate, the measuring system comprises a fiber-substrate interface between semi-conductor optical amplifier 16 and optical fiber amplifier unit 14 and preferably also between semi-conductor optical amplifier 16 and interferometric measuring sub-system 18 or parts of interferometric measuring sub-system 18.

In an electrically pumped semi-conductor optical amplifier, the amplification depends on the occupation number of states that provide for stimulated emission. This occupation number decreases with increasing intensity of the amplified light, as a result of a shifting balance between pumping and emission. Typically, electrically pumped semi-conductor optical amplifier cannot output more than a predetermined maximum light intensity level and its non linearity can be further characterized by the light intensity at its input that results in half the predetermined maximum light intensity level at the output.

Instead of semi-conductor optical amplifier 16 an non-linear absorber or a series connection of semi-conductor optical amplifier and a non-linear absorber may be used. Such an embodiment may be illustrated with a figure similar to FIG. 1, except that item 16 is replaced in the optical path by a non-linear absorber or a combination of a semi-conductor optical amplifier and a non-linear absorber series in the optical path.

An example of an effect that contributes linearly to absorption is two photon absorption, which involves absorption of two photons for a single absorption transition of the absorber. This requires the availability of two photons, and therefore occurs increasingly with increasing photon availability. It depends on the square of the incoming light intensity at the absorber. See (see https://en.wikipedia.org/wiki/Two-photon_absorption) and J Almeida et al "Third-order nonlinear spectra and optical limiting of lead oxifluoroborate glasses" in Optics Express 17221 (Vol 19 No 18).

In other examples the non-linearity of the absorption by the non-linear absorber may depend on the occupation number of certain states. This may result in a non-linear increase in absorption when the increased light intensity changes the occupation numbers in a way that makes more absorption processes possible.

In operation, pulsed light source 10 repeatedly transmits light pulses into optical sensing fiber 12 and detects strain change by comparing measurements on the return light that is received with the same time delay due to backscattering of light from pulses that have been transmitted at different time points.

Such measurements are known per se. For reference such a method will be briefly described. Due to distributed Rayleigh scattering within optical sensing fiber 12, each light pulse results in return light during a time interval of twice the time needed for light to travel between the ends of optical sensing fiber 12.

Interferometric measuring sub-system 18 measures interference between light returned from a pair of spaced positions within optical sensing fiber 12, preferably the phase difference between the light returned from a pair of spaced positions within optical sensing fiber 12, and repeats this for successive pairs of positions. The successive pairs each involve a first position and a second position at a distance from the first position. This results in measurements of the interference signals for successive time delays from transmission of a light pulse into optical sensing fiber 12 to the return of backscattered light from the first position in successive pairs. When a strain arises in optical sensing fiber 12 between the positions in a pair, this will result in a change in the fiber length and hence a change of the measured interference for the pair. Interferometric measuring sub-system 18 compares the measurements obtained using light pulses transmitted at a different time point in order to detect such a strain change.

Most commercially available optical fibers are developed to minimize the transmission loss. Therefore the Rayleigh backscattering is extremely low. The Rayleigh Backscatter coefficient for a standard commercial telecom fiber e.g. the Corning SMF-28 Ultra is about minus eighty dB. The light intensity of the backscattered signal is power is very low, typically in the order of minus 40 dBm for distributed dynamic strain measurement system based on Rayleigh scattering. In order to obtain detectable interference signals a fiber amplifier unit 14, e.g an optically pumped EDFA or YDFA may be used to amplify the light intensity of the backscattered signal significantly e.g. by 30-40 dB. Pulsed light source 10 may be configured to generate light at a wavelength of 1550 nm or 1064 nm to make optimal use of such a fiber amplifier. In practice, such fiber amplifiers, when used for such a large amplification, add noise that significantly reduces the signal to noise ratio. By placing a low noise fiber optical fiber amplifier with a lower amplification in front, the signal to noise ratio can kept higher.

Any type of interferometric measuring sub-system 18 may be used. FIG. 1 shows an embodiment that measures simple two signal interference. This embodiment of interferometric measuring sub-system 18 comprises a first and second optical path 180a,b, an optical combiner 183, and opto-electronic detector 185, a processing circuit 188 and a memory 189. Opto-electronic detector 185 comprises an analog to digital converter (as used herein this covers the possibility that the analog to digital converter can be called part of processing circuit 188, and converts a signal from the opto-electronic detector). Interferometric measuring sub-system 18 is configured to distribute the amplified light from semi-conductor optical amplifier 16 over first and second optical path 180*a,b*, e.g. by means of a splitter in interferometric phase measuring sub-system 18. Outputs of first and second optical paths 180*a,b* are coupled to optical combiner 183

The optical path lengths from semi-conductor optical amplifier 16 to first and second inputs of three-way coupler 184 via first and second optical path 180*a,b* differ, e.g. by one or more meters. By way of illustration a delay element 182 such as an optical fiber coil is shown in second optical path 180*b* to provide for the path length difference.

In operation, optical combiner 183 combines light from first and second optical path 180*a,b* Interference between the light along the different paths occurs. Opto-electronic detector 185 produces measurements of this intensity and processing circuit 188 is configured to read out the intensity compute the phase difference. Processing circuit 188 has inputs coupled to outputs of opto-electronic detectors 186*a-c*. For accurate measurements of the position of the strain a high measurement bandwidth e.g. of at least 100 MHz is desirable. Opto-electronic detector 185 performs analog to digital conversion. Processing circuit 188 may store Intensity values for different delays from transmission of the light pulse in memory 189.

FIG. 1*a* shows an embodiment wherein phase difference is computed instead of direct interference intensity. This embodiment comprises a three-way coupler 184 instead of optical combiner 183, and first, second and third opto-electronic detector 186*a-c*. Outputs of first and second optical paths 180*a,b* are coupled to first and second inputs of three-way coupler 184. A first, second and third output of three-way coupler 184 are coupled to a first, second and third opto-electronic detectors 186*a-c*. Opto-electronic detectors 186*a-c* comprise analog to digital converters. Processing circuit 188 has inputs coupled to outputs of opto-electronic detectors 186*a-c*. Processing circuit 188 is further coupled to memory 189.

In operation, three-way coupler 184 combines light from first and second optical path 180*a,b* with different relative phase shift at the different outputs of three-way coupler 184. At each output of three-way coupler 184 interference between the light from the different paths occurs, and this results in an intensity of the light at the output according the absolute square of the sum of the wave vectors at the output, which depends on the individual intensities of the light from first and second optical path 180*a,b*, their mutual polarization state and their phase difference. Since the relative phase shifts imparted by three-way coupler 184 are known, it is possible to cancel out the individual intensities and visibility mathematically and solve the phase difference from the intensities at the three outputs.

Although a preferred embodiment is shown that uses the same optical fiber amplifier unit 14, and the same semi-conductor optical amplifier 16 for amplifying the intensity for both first and second optical path 180*a,b*, it should be noted that instead each optical path 180*a,b* may have its own semi-conductor optical amplifier 16 before of after the optical path. Such semi-conductor optical amplifiers 16 may have identical amplification characteristics, but that is not necessary. Instead of, or in addition to the semi-conductor optical amplifier 16 each optical path 180*a,b* may have its own linear absorber. When each optical path 180*a,b* has its own semi-conductor optical amplifier 16 an/or non-linear absorber, it may also have its own (part of) optical fiber amplifier unit 14 before the semi-conductor optical amplifier 16 an/or non-linear absorber. Such an own (part of) optical fiber amplifier unit 14 may be located before of after the optical path.

Opto-electronic detectors 186*a-c* produce digitized measurements of these intensities and processing circuit 188 is configured to compute the phase difference. For accurate measurements of the position of the strain a high measurement bandwidth e.g. of at least 100 MHz is desirable. Processing circuit 188 may be configured to compute the phase differences in real time, as the measurements arrive, but this is not needed: instead the measurements from opto-electronic detectors 186*a-c* for different delays from transmission of the light pulse, or intermediate results may be stored in memory 189 and the phase differences may be computed later. Processing circuit 188 is configured to compare the phase differences computed from backscatter of a first light pulse with the phase differences computed from backscatter of a different, second light pulse at the same delays from the first and second light pulse. A result of this comparison may be used to detect the positions of strain changes along optical sensing fiber 12. The comparison and/or the position detection may be performed in processing circuit 188 or another computer or computers (not shown) that are programmed to do so.

Although implementations with a three way coupler 184 has been described by way of example, it should be noted that other methods may be used, e.g. using a different type of interferometer. Also, other implementations using a three way coupler 184 are also possible. For example, embodiments may be used with opto-electronic detectors on different sides of three way coupler 184 and/or the optical paths on the side opposite the semi-conductor optical amplifier.

Use of a phase measurement rather than just interference intensity is advantageous because phase changes are linearly dependent on length changes only, whereas interference intensity also depends on amplitude changes. The amplitude may depend in an unpredictable way on the scattering positions. Use of computed phase values makes quantitative strain change measurements possible.

In each case, a digital measurement of the intensity of at least one mix of the light from first and second optical path 180*a,b* and other digital measurements of other intensities are needed that have sufficient precision to compute the phase even though the amplitude in 10*a,b* can change unpredictably. Thus the analog to digital conversion defines a usable range for intensities obtainable by coherent combinations of light on the detectors. Light from the optical paths is outside the usable range if the intensity that would be obtained by coherent combination would have an intensity that exceeds the maximum intensity value that the analog to digital converter can represent as a digital result or if this coherent combination is so small that there are less than a threshold number of quantization steps of the analog to digital converter below the signal size for an accurate representation of the size (e.g. too few significant bits). For example signal is in the usable range if it is at least fifty, and more preferably a hundred, quantization steps above the lowest quantization level (e.g. so that at least six or seven bits of the quantization result are significant for representing the size).

The usable range in defines a usable light intensity range of a notional coherent combination at the input of opto-electronic detectors 185 or 186*a-c* that would results in signals in a usable analog to digital conversion range. A reliable computation is possible only if the square of the sum of the absolute size of the wave vectors of the light from first and second optical path 180*a,b* is within the usable intensity range for the analog to digital converter 186*a-c*. It should be noted that an intensity in the usable range do not ensure reliable phase measurements. This may be impossible e.g. if the scatter intensity at one location is zero or too small.

Figure 2:
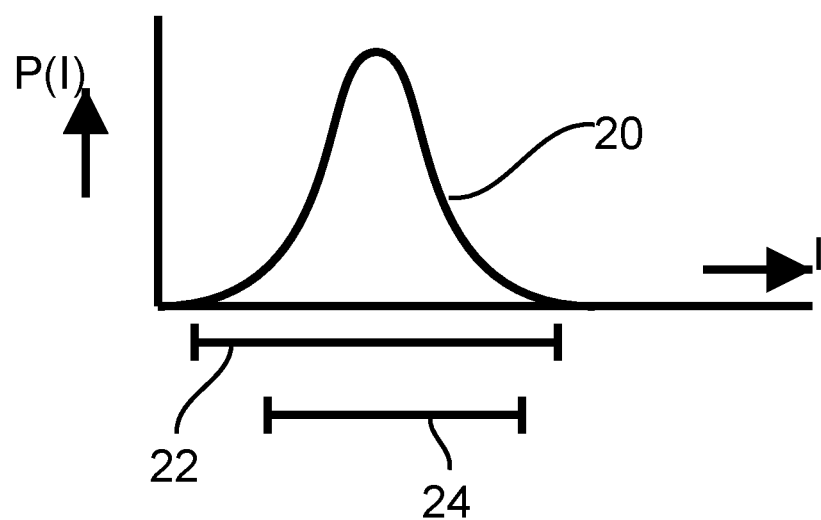
FIG. 2 illustrates Rayleigh backscattering intensities and the response of the non-linear optical amplifier.
Figure 2:
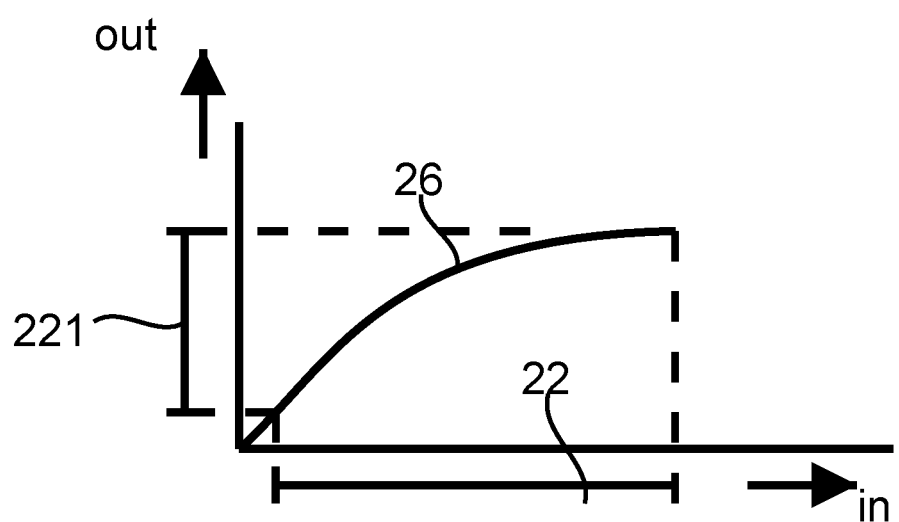

FIG. 2 illustrates a problem with measurement of Rayleigh backscattering. The backscatter intensity fluctuates rapidly as a function of position along optical sensing fiber 12. This depends on the density of scatter centers as a function of position and the way in which the phases of their scattering adds up. This gives rise to a probability density 20 of the backscatter intensity. The backscatter intensity can be amplified so that the range of fluctuation 22 of its intensity overlaps with the usable intensity range 24 at the analog to digital converters 186*a-c*. But the fluctuation range is so large that the amplification cannot fit the range of fluctuations 22 within the usable intensity range 24. When the intensity is amplified so that the top of the fluctuation range does not exceed the usable intensity range, the amplified smallest backscatter intensity remains below the usable intensity range. Vice versa when the intensity is amplified so that the bottom of the fluctuation range is within the usable intensity range, the amplified top of the fluctuation range is above the top of the usable intensity range. In both cases accurate phase change measurements are impossible.

This problem is addressed by including semi-conductor optical amplifier 16 or non-linear absorber operating in the non-linear working range between optical fiber amplifier unit 14, and interferometric phase measuring sub-system 18. Semi-conductor optical amplifier 16 provides a non linear response relation 26 between the light intensity at its input and the light intensity at its output. The same goes for a non-linear absorber. The change of intensity of the amplified light produced as a result of change of the intensity of the incoming light decreases with increasing intensity of the incoming light. This has the effect of compressing a fluctuation range 22 into a compressed output range, and hence decreasing the minimum fraction of backscatter intensities that remains outside the usable intensity range when the amplification by optical fiber amplifier unit 14 is selected to fit as much of the fluctuation range into the usable intensity range as possible. The non-linear response relation 26 of semi-conductor optical amplifier 16 has the effect that the derivative of the transmitted light intensity with respect to the input light intensity of the electrically pumped semi-conductor optical amplifier decreases with increasing input intensity. Thus, a higher intensity range will be compressed relative to a lower intensity range. The same goes for a non-linear absorber. Moreover, semi-conductor optical amplifier 16 has the effect that no input intensity will be amplified to an output intensity above a predetermined saturation output intensity. Preferably, the intensity caused by light from each individual one of the optical paths at the detector by the saturation intensity of semi-conductor optical amplifier 16 is equal to or less than a quarter of the highest intensity level that can be measured by the detector. This ensures that the interference of two such signals cannot exceed this highest intensity level.

In theory optical fiber amplifier unit 14 could be used or extended on its own to compress the fluctuation range. Like semi-conductor optical amplifier 16 has a non linear response characteristic, but this depends on draining the energy supplied by optical pumping, which occurs more slowly than the compression effect of semi-conductor optical amplifier 16. As a result rapid backscatter fluctuations cannot be kept in the usable intensity range. The same goes for uses of feedback control of the pumping energy of optical fiber amplifier unit 14 to control the gain optical fiber amplifier unit 14.

In an embodiment the system comprises a control circuit configured to vary the optical amplification factor of optical fiber amplifier unit 14 as a function of time from the time point of the light pulse. A predetermined time dependence of the amplification factor may be used to compensate for the general decrease of the received Rayleigh scattering intensity with time, due to the increase of the distance along the optical fiber from which the received scattering originates.

The function of this control circuit may be performed by processing circuit 188 for example, or any other suitable circuit. The general decrease of the received Rayleigh scattering intensity as a function of time from the light pulse, also called the envelope, can be determined for example by low pass filtering the Rayleigh scattering intensity as a function of time. The variable amplification factor may be selected inversely proportional to the envelope without the variable amplification factor. Alternatively, a feedback circuit may be used to control the amplification factor, using a difference between an average intensity measured by a measuring circuit and a reference to control the amplification factor.

A combination of non-linear amplification or absorption and such a time variable optical amplification factor of optical fiber amplifier unit 14 may be used to ensure that the relative position of the intensity distribution at the output of optical fiber amplifier unit 14 and the compression range of the -linear semi-conductor optical amplifier 16 or non-liner absorber remains the same as a function of time from the time point of the light pulse. This improves the signal to noise ratio and reduces risks of damage or blinding. Also preferably, the amplification factor of optical fiber amplifier unit 14 is set so that the peak of the probability density 20 of the backscatter intensity at the output of optical fiber amplifier unit, and/or its average 14 probability density 20 lies in the compression range.

For long optical fibers, a scatter position dependent probability density 20 of the Rayleigh scatter can be defined, and preferably the peak and/or the average at position of the probability density 20 of the Rayleigh scatter at the end of the fiber.

Similar considerations apply for the non-linear absorber. Here a compression range can be defined in terms of intensities where the input/output ratio of the non-linear absorber is less than half that ratio for small intensity (in the limit that the intensity goes to zero.

Under some circumstances, the use of semi-conductor optical amplifier 16 in series with optical fiber amplifier unit may give rise to a risk of damage. When optical fiber amplifier unit 14 is pumped while no significant input intensity is supplied, such as before the light pulse from pulsed light source 10, optical fiber amplifier unit 14 may produce a temporary high gain once more input intensity is suddenly supplied to its input, such as due to backscatter shortly after the light pulse. This high gain results in a high intensity amplified light, which can damage semi-conductor optical amplifier 16. This can be prevented for example by using a transient suppressing optical fiber amplifier, such as disclosed in US20100221012 or a configuration presented by Shiraiwa (Shiraiwa M., et al., "Performance evaluation of a burst-mode EDFA in an optical packet and circuit integrated network", Optics Express, Vol. 21, No. 26, DOI: 10.1364/OE:21.032589, 2013)

Another solution is to include a shutter between optical fiber amplifier unit 14 and semi-conductor optical amplifier 16, and a control circuit to close the shutter during a time interval wherein the high intensity amplified light occurs after the light pulse. Another solution is to configure the optical pump of optical fiber amplifier unit 14 to start pumping so late in relation to the light pulse that the temporary high gain is prevented or reduced. However such solutions can make strain detection in a front part of optical sensing fiber 12 difficult. Use of a transient suppressing optical fiber amplifier makes it possible to measure strain in more of optical sensing fiber 12.

Preferably, semi-conductor optical amplifier 16 is realized in a planar semi-conductor device, whereas optical fiber amplifier unit 14 and delay element 182 are realized in optical fibers. However, a planar semi-conductor optical amplifier 16 typically operates to amplify in only one polarization component, which can reduce the fraction of positions in optical sensing fiber 12 because Rayleigh back scattering produces randomly fluctuating polarization. To increase this fraction, a dual planar semi-conductor optical amplifier or other configuration to solve the semi-conductor optical amplifier SOA polarization dependency e.g. a semi-conductor optical amplifier with suppressed polarization sensitivity may be used.

Figure 3:
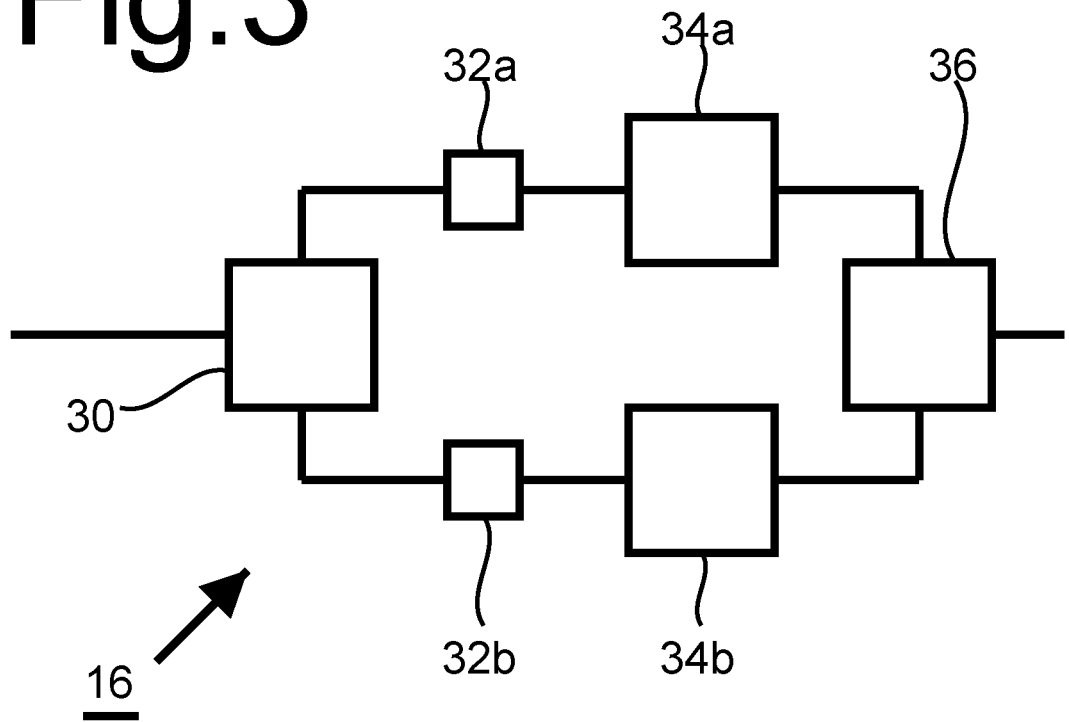
FIG. 3 shows a dual semi-conductor optical amplifier configuration

FIG. 3 shows a dual planar semi-conductor optical amplifier 16, comprising a polarization splitter 30, polarization rotators 32*a,b*, a first and second semi-conductor optical amplifier 34*a,b* and an optical combiner 36. An optical path from the output of the optical fiber amplifier unit (not shown) to an input of polarization splitter 30 supplies amplified backscattered light to polarization splitter 30. Further optical paths from outputs of polarization splitter 30 to first and second semi-conductor optical amplifier 34*a, b* supply different polarization components of this light to first and second semi-conductor optical amplifier 34*a, b* respectively, via polarization rotators 32*a,b* in the further optical paths.

First and second semi-conductor optical amplifier 34*a,b* may be implemented on a together on single planar substrate, so that they mainly amplify light with a single polarization direction. Polarization rotators 32*a,b* rotate the polarization direction of the polarization components from polarization splitter 30 into the polarization direction that is amplified by first and second semi-conductor optical amplifier 34*a,b* respectively. A polarization rotator in one of the further optical paths may suffice, or when first and second semi-conductor optical amplifier 34*a* 32*a,b* are oriented so that they amplify different polarization directions, polarization rotators may not be needed altogether. Output optical paths from first and second semi-conductor optical amplifier 34*a,b* feed the amplified polarization components from first and second semi-conductor optical amplifier 34*a,b* to optical combiner 36. Optical combiner 36 is configured to combine the amplifier light from first and second semi-conductor optical amplifier 34*a,b* and to supply the combination as the output of the dual planar semi-conductor optical amplifier.

Figure 3A:
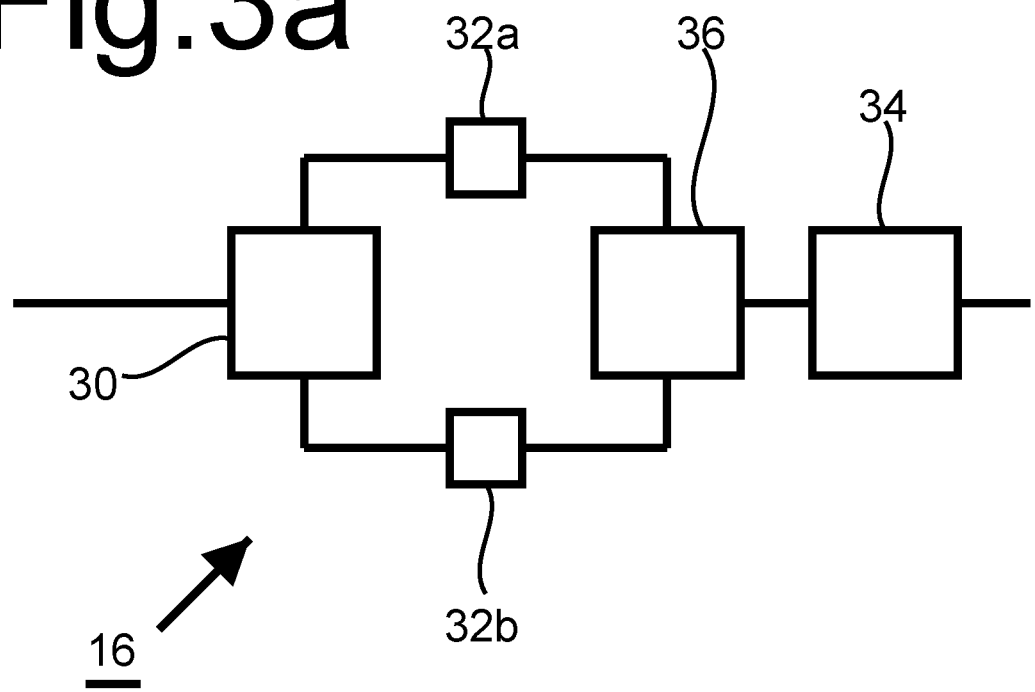
FIG. 3a shows a semi-conductor optical amplifier preceded by a polarization equalizer

FIG. 3*a* shows another possible configuration, wherein optical combiner 36 has been moved behind the combination of polarization splitter 30 and polarization rotator a 32*a,b* to combine the optical power in both polarization directions into one single linear polarized output and feed this to a semi-conductor optical amplifier 34. In this embodiment, the single linear polarized output is at least partly in the direction for which semi-conductor optical amplifier 34 provides maximum gain, e.g. with no more than forty five, or thirty degree deviation from that direction. Preferably, the polarization direction of the single linear polarized output is in the direction for which semi-conductor optical amplifier 34 provides maximum gain.

By means of such embodiments, interferometric phase measuring sub-system 18 is provided with amplified light with a compressed intensity range from both polarization components of the backscattered light from the optical sensing fiber.

In another embodiment two interferometers may be used to measure interference of the polarization components separately, using a polarization splitter with an input coupled to the output of the optically pumped optical fiber amplifier and a first polarization output coupled to the input of the semi-conductor optical amplifier, a polarization rotator with an input coupled to a second polarization output of the polarization splitter, a further electrically pumped semi-conductor optical amplifier with an input coupled to an output of the polarization rotator, a further interferometer having an input coupled to the first end of the optical sensing fiber; and a further electronic phase measuring sub-system coupled to an output of the further interferometer.

The invention claimed is:

1. A position dependent strain measurement system for measuring strain using Rayleigh backscattering from within an optical sensing fiber, wherein the frequencies of occurrence of different backscatter intensities are characterized by an intensity distribution as a function of backscatter intensity, the measurement system comprising:
   a pulsed light source;
   the optical sensing fiber, a first end of the optical sensing fiber being coupled to an output of the pulsed light source;
   an interferometer comprising an optical splitter with an input coupled to the first end of the optical sensing fiber, and a first optical path and a second optical path of different optical length with inputs coupled to respective outputs of the optical splitter;
   an electronic phase measuring sub-system coupled to outputs of the first optical path and the second optical path, the electronic phase measuring sub-system comprising at least one light intensity detector configured to detect an interference intensity of a combination of light from the first optical path and the second optical path, each of the at least one light intensity detector defining a usable range of intensities of coherent combinations of intensities of light from the first optical path and the second optical path;
   an optically pumped component, coupled between the first end of the optical sensing fiber and the electronic phase measuring sub-system, wherein the optical pumped component is taken from the group consisting of:
      a first optically pumped optical fiber amplifier that is in series with the first optical path and the second optical path, and
      a first optically pumped optical fiber amplifier and a second optically pumped optical fiber amplifier, that are in series with the first optical path and the second optical path, respectively;
   an electrically pumped component taken from the group consisting of:
      a first electrically pumped semi-conductor optical amplifier in series with the first optical path and the second optical path, wherein the first electrically pumped semi-conductor optical amplifier is between the first optically pumped optical fiber amplifier and the electronic phase measuring sub-system, and a first electrically pumped semi-conductor optical amplifier and a second electrically pumped semi-conductor optical amplifier in series with the first optical path and the second optical path, respectively, wherein the first electrically pumped semi-conductor optical amplifier and the second electrically pumped semi-conductor optical amplifier are between the electronic phase measuring sub-system and the optically pumped component;

wherein the optically pumped component, and/or the electrically pumped component provide an amplification factor or factors that ensure that a coherent combination, of intensities obtainable at the at least one detector from an average intensity of the Rayleigh backscattering intensity, is in a usable range; and wherein light intensity dependent derivative transmission factors of the electrically pumped component cause a higher intensity part of an intensity distribution to be compressed relative to a lower intensity part of the intensity distribution.

2. The measurement system according to claim 1, wherein the amplification, of the optically pumped component, is arranged to bring the intensity of light obtainable from the average intensity of the Rayleigh backscattering intensity at the input, of the electrically pumped component, to an intensity where the light intensity dependent derivative transmission factor is less than half a small signal transmission factor of the electrically pumped component.

3. The measurement system according to claim 1, wherein the electrically pumped component is characterized by a saturated optical output intensity, and wherein the saturated optical output intensity is configured to result in an intensity from individual ones of the optical path at the at least one detector that is equal to or less than a quarter of the intensity at the top of the usable range.

4. The measurement system according to claim 1, wherein the electronic phase measuring sub-system comprises:

an N-way coupler, with N being at least three, configured to form N combinations of light from the first optical path and the second optical path with N different relative phase shifts, N detectors configured to measure intensities of respective ones of the N combinations, and a computing system configured to compute a phase difference between the light from the first and second optical paths from the measured intensities.

5. The measurement system according to claim 1, wherein the average is an average of backscattering intensity from a distal part of the optical sensing fiber.

6. The measurement system according to claim 1, comprising a gain control circuit configured to vary the amplification factor or factors of the first optically pumped optical fiber amplifier or the first and second optically pumped optical fiber amplifiers with time from the light pulse, so that a time dependent average of the Rayleigh backscattering intensity at the electronic phase measuring sub-system is kept in a usable intensity range.

7. The measurement system according to claim 1, wherein:

the first electrically pumped semi-conductor optical amplifier provides for amplification of only a single polarization component, and the system comprises:

a polarization splitter with:
an input coupled to an output of the first optically pumped optical fiber amplifier, and
a first polarization output coupled to an input of the first electrically pumped semi-conductor optical amplifier;

a polarization rotator with an input coupled to a second polarization output of the polarization splitter, a further electrically pumped semi-conductor optical amplifier with an input coupled to an output of the polarization rotator, and an optical combiner with:
inputs coupled to outputs of the electrically pumped component and the further electrically pumped semi-conductor optical amplifier, and
an output coupled to the interferometer.

8. The measurement system according to claim 1, wherein:

the first electrically pumped semi-conductor optical amplifier provides for amplification of only a single polarization component, and the system comprises:

a polarization splitter with an input coupled to an output of the optically pumped component, a polarization rotator with an input coupled to a first polarization output of the polarization splitter, and an optical combiner with:
inputs coupled to a second polarization output of the polarization splitter and an output of the polarization rotator, and
an output coupled to the input of the electrically pumped component.

9. The measurement system according to claim 1, wherein:

the first electrically pumped semi-conductor optical amplifier provides for amplification of only a single polarization component, and the system comprises:

a polarization splitter with an input coupled to an output of the optically pumped component and a first polarization output coupled to an input of the electrically pumped component, a polarization rotator with an input coupled to a second polarization output of the polarization splitter, a further electrically pumped semi-conductor optical amplifier with an input coupled to an output of the polarization rotator, a further interferometer having an input coupled to the first end of the optical sensing fiber; and a further electronic phase measuring sub-system coupled to an output of the further interferometer.

10. The measurement system according to claim 1, wherein the first optically pumped optical fiber amplifier and/or the second optically pumped optical fiber amplifier is a transient suppressing optical fiber amplifier.

* * * * *